Nov. 30, 1965  G. McQ. KILMER  3,220,784
BICYCLE SPLIT AXLE
Filed May 6, 1964
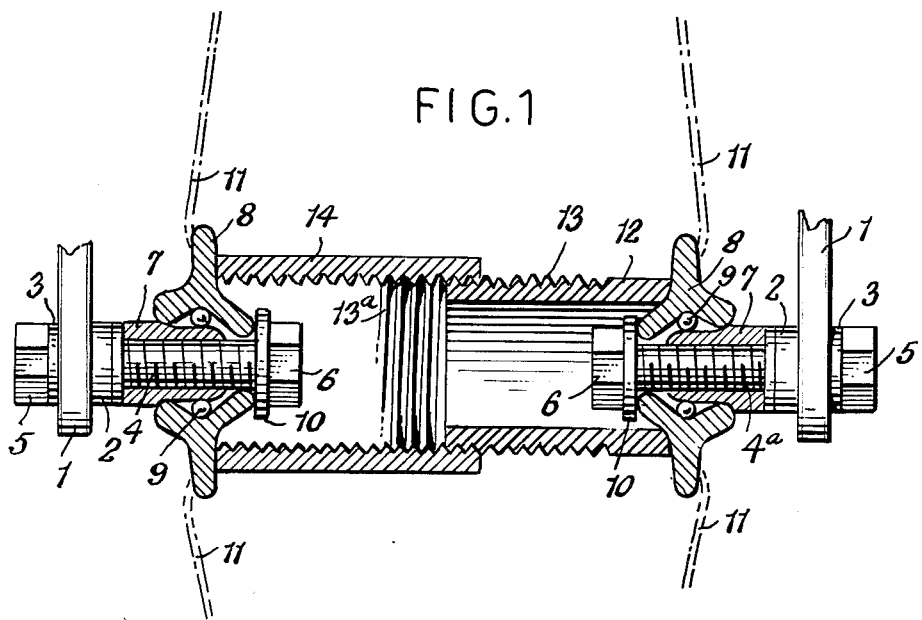
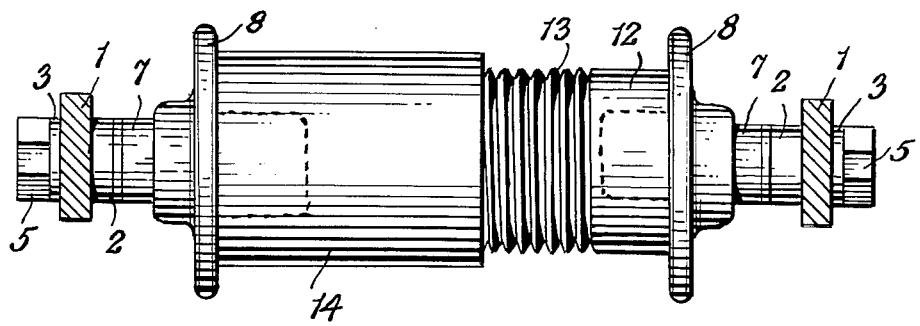
INVENTOR.
George McQ. Kilmer 3,220,784
BICYCLE SPLIT AXLE
George McQ. Kilmer, % Veterans Administration
Hospital, Sheridan, Wyo.
Filed May 6, 1964, Ser. No. 365,290
5 Claims. (Cl. 308—192)

This invention relates to wheel construction, and more particularly to the hub of a wheel of the type used in a bicycle and especially in the front fork thereof.

It is one of the objects of the invention to provide in a hub construction an arrangement by which the wheel can be readily dismantled in a manner to result in a reduction in the transverse width or thickness of the wheel, thereby permitting it to be packed for shipment or transport in a small carton or other relatively flat container.

It is an object of the invention to provide a hub construction composed of parts which can be readily assembled or dis-assembled or replaced in case of wear or breakage and which will, as heretofore stated, enable the overall thickness of the wheel to be materially reduced for storage or shipment.

More particularly, the invention contemplates the provision of a hub which includes a pair of threadably-engaged, axially-adjustable sleeves co-operating in the formation of the body of the hub, and provided with a ball-race at each end, and separate axially aligned axel members located at the opposite ends of the hub body, said axle members extending through the ball races and being engaged with the front fork of the bicycle.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a longitudinal sectional view of a bicycle wheel hub embodying the structure of the invention, and FIG. 2 is an elevational view of the same.

Referring to the drawing, there is shown therein at 1, the legs of the conventional front wheel fork of a bicycle and in which the improved hub construction is mounted. The hub as shown includes a pair of separate and independent axles which are indicated respectively at 4 and 4a. These axles which are separate and distinct from one another are axially aligned, and each of them consists of a threaded stud provided at the inner end with a head 6 and at the outer end with spacers 2 and 3 between which the legs 1 of the front wheel fork are clamped and held by the nuts 5.

The axles each receive a ball race composed of the inner part 7 threadably received on one of the axles and the outer co-operating cup 8, the balls 9 being maintained in the conventional manner between the race parts 7 and 8. The cup 8 is flanged and the flange receives the spokes 11 of the wheel in the known manner.

The hub includes spacing means which extends between the ball races and abuts against the parts 8 and holds the same apart for the required distance while maintaining the spokes in a tensional condition. Such spacing means consists of a tube or sleeve composed of the two sections 12 and 14 threadably coupled together. The part 14 is provided with internal threads 13a for threadable engagement with the threads 13 provided on the part 12 of the sleeve. The two parts 12 and 14 of the sleeve are thus threadably adjustable axially of the sleeve to thereby regulate the effective length of the sleeve and cause it to hold the axles and the ball races the required distance apart while maintaining the proper tension on the spokes 11.

The arrangement described is such that by the removal of the sleeve, composed of the two telescopically-fitted parts 12 and 14, the axles can be brought toward one another and thus the overall thickness of the wheel will be substantially reduced. This will be found very convenient for shipping, transporting or storing a bicycle when its wheels are detached, since the parts of the bicycle, including the wheels, can be packed in relatively small cartons.

Since the hub as shown has a split or divided axle it is necessary that the spokes of the wheel be maintained taut and this can be readily done by the adjustment of the effective length of the parts 12 and 14 of the hub body or spacing sleeve. The taut spokes tend to pull the bearing cup disks inwardly when an inequality in the road is encountered by the wheel and it has accordingly been found that a continuous axle extending from one wheel bearing to the other, is unnecessary.

The removable sleeve or spacer composed of the parts 12 and 14 prevents the inward collapse of the wheel, for each time that the spokes exert a compressive force on the sleeve or spacer, it exerts an equal and opposite resistant force. It has also been found, by extensive road test, that a construction such as that herein described, aids materially in absorbing road shocks.

To facilitate the placement of the parts 12 and 14 in position, the ends of these parts can be notched substantially as shown in dotted lines in FIG. 2. One or the other of the parts can be struck with a hammer in the notch to threadably adjust them after they are in place to secure the proper adjustment.

While I have herein suggested that the improved hub construction shall be particularly useful for the front wheel of a bicycle, it will be apparent that it can readily be embodied in other wheels when desired.

Having thus described a single embodiment of the invention, it is obvious that the same is not to be restricted thereto, but is broad enough to cover all structures coming within the scope of the annexed claims.

What I claim is:

1. A hub for a bicycle wheel comprising, a hub body consisting of a pair of sleeves threadably engaged and axially adjustable to regulate the overall length of the body, a bearing at each end of the joined sleeves, a separate axle extending through each bearing, the axles being axially aligned, and a bicycle fork engaged by the axles.

2. A hub as provided for in claim 1, wherein the separate axles are spaced apart and are held in their spaced relation by means of the hub body.

3. A hub as provided for in claim 1, wherein the bearings comprise ball races and the same include flanges to which wheel spokes are attached, and the ends of the threadably-united sleeves bear against the flanges and serve as the only means extending between the ball races and holding them apart.

4. A hub for a bicycle wheel comprising, a pair of spaced-apart separate axles arranged co-axially, each of said axles being attached to the leg of a bicycle fork, a ball race arranged around each axle and a tubular hub body located between the ball races and holding them apart, the hub body being composed of a plurality of sleeves which are threadably and axially adjustable to regulate the effective length of the hub body, the axles being held in spaced relation by means of said hub body, said hub body being the sole means for holding the ball races in their spaced-apart relationship.

5. A hub body as provided for in claim 1, including a wheel rim, the hub body being composed of a pair of sleeves located between the ball races and said ball races include flanges into which spokes originating from the wheel rim are inserted.

(References on following page)

References Cited by the Examiner

UNITED STATES PATENTS

| | | | |
|---|---|---|---|
| 312,277 | 2/1885 | Latta | 308—192 X |
| 533,341 | 1/1895 | Boyle | 308—192 X |
| 695,448 | 3/1902 | Evans | 301—60 |
| 727,592 | 5/1903 | Copeland | 308—192 |
| 1,500,516 | 7/1924 | Morton | 308—191 |
| 2,073,736 | 3/1937 | Duffy | 308—192 |
| 2,280,936 | 4/1942 | Swanson | 301—105 X |

FOREIGN PATENTS 1,043,414   6/1953   France.

BENJAMIN HERSH, *Primary Examiner.*

ARTHUR L. LA POINT, *Examiner.*